US012163314B2

(12) United States Patent
Konishi et al.

(10) Patent No.: US 12,163,314 B2
(45) Date of Patent: Dec. 10, 2024

(54) HYDRAULIC CIRCUIT FOR A CONSTRUCTION MACHINE

(71) Applicant: Caterpillar SARL, Geneva (CH)

(72) Inventors: Isao Konishi, Akashi (JP); Hiroshi Maeda, Akashi (JP); Hirotaka Minamiura, Akashi (JP); Kazuya Miyamori, Akashi (JP); Yoshitaka Kato, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/210,149

(22) Filed: Jun. 15, 2023

(65) Prior Publication Data

US 2023/0407597 A1 Dec. 21, 2023

(30) Foreign Application Priority Data

Jun. 15, 2022 (JP) ................................ 2022-096413

(51) Int. Cl.
*E02F 9/22* (2006.01)
*F15B 13/02* (2006.01)
(Continued)

(52) U.S. Cl.
CPC .......... *E02F 9/2228* (2013.01); *E02F 9/2235* (2013.01); *E02F 9/226* (2013.01);
(Continued)

(58) Field of Classification Search
CPC ....... E02F 9/2296; E02F 9/2217; F15B 1/024; F15B 21/14; F15B 2211/7053;
(Continued)

(56) References Cited

U.S. PATENT DOCUMENTS

| | | | | |
|---|---|---|---|---|
| 9,103,096 B2 * | 8/2015 | Kondo | .................. | E02F 9/2296 |
| 2013/0028695 A1 * | 1/2013 | Blakeman | ............. | F15B 21/005 60/459 |

FOREIGN PATENT DOCUMENTS

| | | |
|---|---|---|
| JP | H0545350 U | 6/1993 |
| JP | H08128076 A | 5/1996 |

(Continued)

*Primary Examiner* — Nathaniel C Chukwurah

(57) ABSTRACT

Provide a hydraulic circuit that can prevent damage to the oil cooler while suppressing excessive rise in the temperature of the operating oil. The hydraulic circuit includes a control valve that controls supply of operating oil from the hydraulic pump to the work tool; a first return pipeline that connects the control valve with the operating oil tank; an oil cooler disposed in the first return pipeline on a downstream side of a first check valve; a second return conduit that branches from the first return pipeline and extends to the operating oil tank without passing through the oil cooler; a third return pipeline that branches from the pipeline and extends to the first return pipeline between the first check valve and the oil cooler; a solenoid valve disposed in the third return pipeline; an operating device that outputs an operating signal of the work tool; a controller that opens the control valve and the solenoid valve based on the signal output from the operating device; and an operating oil temperature sensor. The controller reduces the amount of operating oil passing through the oil cooler when a temperature detected by the temperature sensor is less than a predetermined value.

5 Claims, 3 Drawing Sheets

(51) Int. Cl.
*F15B 19/00* (2006.01)
*E02F 3/96* (2006.01)

(52) U.S. Cl.
CPC .......... *E02F 9/2267* (2013.01); *E02F 9/2275* (2013.01); *E02F 9/2296* (2013.01); *F15B 13/027* (2013.01); *F15B 19/00* (2013.01); *E02F 3/966* (2013.01)

(58) Field of Classification Search
CPC ............ F15B 2211/761; F15B 2211/88; F15B 2211/3058; F15B 2211/7135; F15B 2211/6309; F15B 2211/20523; F15B 2211/212; F15B 2211/665; F15B 2211/20507; F15B 2211/7142; F15B 2211/7058; F15B 2211/20576; F15B 2211/6306
See application file for complete search history.

(56) References Cited

FOREIGN PATENT DOCUMENTS

| | | | |
|---|---|---|---|
| JP | H10274212 | A | 10/1998 |
| JP | H11117914 | A | 4/1999 |
| JP | 2002364603 | A | 12/2002 |
| JP | 6817244 | B2 | 1/2021 |

* cited by examiner

HYDRAULIC CIRCUIT FOR A CONSTRUCTION MACHINE

CROSS-REFERENCE TO RELATED APPLICATION

This application claims priority under 35 USC § 119 and the Paris Convention to Japanese Patent Application 2022-096413 filled on Jun. 15, 2022.

TECHNICAL FIELD

The present invention relates to a hydraulic circuit for a construction machine having a work tool such as a hydraulic hammer.

BACKGROUND

A hydraulic excavator as a typical example of construction machines has a lower traveling body, an upper swiveling body swivelably supported on the lower traveling body, and a front working machine installed on the upper swiveling body. A front working machine for hydraulic excavator includes a boom coupled swingably to an upper swiveling body, and an arm coupled swingably to a tip end of the boom.

In hydraulic excavators, buckets used for digging operations are mostly installed at the tip end of the arm as the work tool, but besides buckets, various work tool can also be installed at the tip end of the arm. As a working tool other than bucket, for example, there are hydraulic hammers (hydraulic circuit breakers) for crushing concrete and rock.

When using the hydraulic hammer as a work tool, the back pressure of the hydraulic hammer must be less than the predetermined value in order to demonstrate the required capabilities of the hydraulic hammer. Therefore, a circuit that returns the hydraulic oil from the work tool to the hydraulic oil tank may be employed without passing through the control valve (see, for example, Patent Document 1).

PRIOR ART DOCUMENTS

Patent Document

Patent Document 1: JP 1997-128076A

SUMMARY OF THE INVENTION

Problems to be Solved by the Invention

However, if the return oil from the hydraulic hammer is configured not to pass through the oil cooler, the temperature of the hydraulic oil may rise excessively during the operation of the hydraulic hammer. On the other hand, if the return oil from the hydraulic hammer passes through the oil cooler, the pressure on the upstream side of the oil cooler will increase and the oil cooler will be damaged if the temperature of the hydraulic oil is low and the viscosity of the hydraulic oil is high.

A technical problem of the present invention is to provide a hydraulic circuit for a construction machine that can prevent the temperature of the hydraulic oil from rising excessively and prevent damage to the oil cooler.

Means for Solving the Problem

According to a first aspect of this invention, there is provided a hydraulic circuit for a construction machine which solves the above technical problem. That is, "A hydraulic circuit for a construction machine, comprising:

a hydraulic pump having a variable capacity, a work tool operated by hydraulic oil discharged by the hydraulic pump, a control valve controlling supply of hydraulic oil from the hydraulic pump to the work tool;

a pair of pipelines connecting the control valve and the work tool;

a first return pipeline connecting the control valve and a hydraulic oil tank;

a first check valve disposed in the first return pipeline;

an oil cooler disposed in the first return pipeline on a downstream side of the first check valve;

a second return pipeline that branches from the first return pipeline and extends into the hydraulic oil tank without passing through the oil cooler;

a second check valve disposed in the second return pipeline;

a third return pipeline that branches from one of the pair of pipelines to extend to the first return pipeline between the first check valve and the oil cooler;

a solenoid valve disposed in the third return pipeline; and an operating device to output a signal for operating the work tool, a controller for opening the control valve and the solenoid valve based on a signal output from the operating device; and a temperature sensor electrically connected to the controller to detect a temperature of the hydraulic oil, wherein the controller reduces an operating oil mass through the oil tank when a temperature detected by the temperature sensor is less than a predetermined value."

Preferably, the controller makes an opening area of the control valve in the case where the temperature detected by the temperature sensor is less than a predetermined value be greater than an opening area of the control valve in the case where the temperature detected by the temperature sensor is greater than or equal to the predetermined value.

It is desirable for the controller to gradually increase the opening area of the control valve as the temperature detected by the temperature sensor decreases.

The controller may make a discharge amount of the hydraulic pump in the case where the temperature detected by the temperature sensor is less than a predetermined value be less than a discharge amount of the hydraulic pump in the case where the temperature detected by the temperature sensor is larger than or equal to the predetermined value.

Preferably, the controller gradually reduces the discharge amount of the hydraulic pump as the temperature detected by the temperature sensor decreases.

Effect of the Invention

In the hydraulic circuit of the construction machine of the present invention, when the operating device outputs a signal, the solenoid valve opens together with the control valve, and the hydraulic oil discharged from the work tool returns to the hydraulic oil tank through the solenoid valve and the oil cooler, so that the temperature of the hydraulic oil can be suppressed from rising excessively.

In addition, in the hydraulic circuit of the construction machine of the present invention, when the temperature detected by the temperature sensor is less than a predetermined value, the operating oil mass passing through the oil cooler is reduced, thereby suppressing excessive pressure rise on the upstream side of the oil cooler and preventing damage to the oil cooler.

DETAILED DESCRIPTION

Now, embodiments of the hydraulic circuit of the construction machine according to the present invention will be described with reference to the drawings above.

Hydraulic Circuit 2

Figure 1:
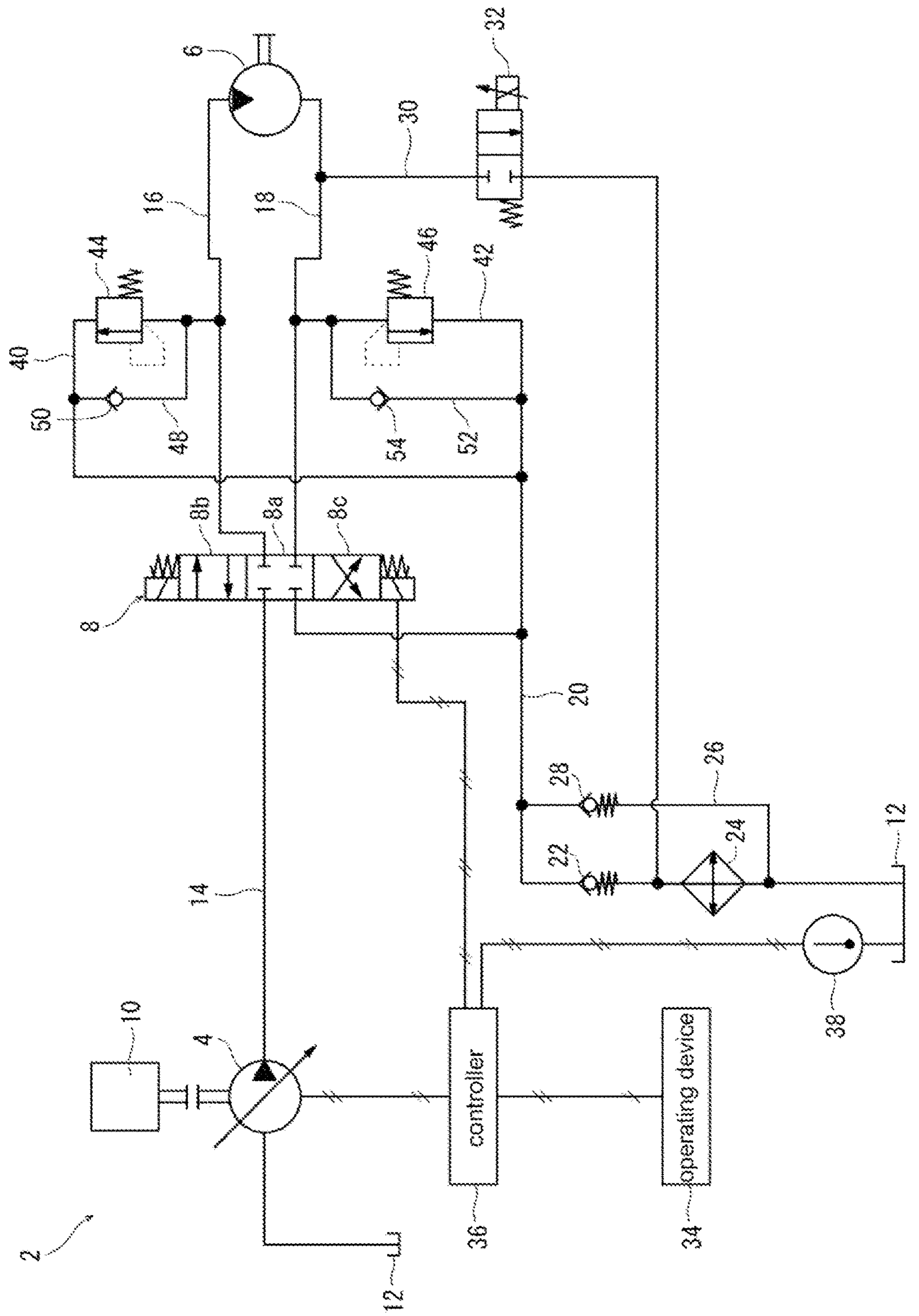
FIG. 1 is a circuit diagram of a hydraulic circuit of the construction machine configured according to the present invention.

The hydraulic circuit 2 of the construction machine shown in FIG. 1 may be mounted, for example, on a hydraulic excavator. The hydraulic circuit 2 includes a hydraulic pump 4 having a variable capacity; a work tool 6 operated by the hydraulic oil discharged by the hydraulic pump 4, and a control valve 8 controlling the supply of the operating oil from the hydraulic pump 4 to the work tool 6.

Hydraulic Pump 4

The hydraulic pump 4 is driven by a drive source 10, such as an engine or an electric motor, and is configured to draw operating oil from the operating oil tank 12 and discharge it into the pump line 14. As shown in FIG. 1, the pump line 14 is a pipeline that connects the hydraulic pump 4 and the control valve 8. In the illustrated embodiment, one hydraulic pump 4 is shown, but two or more hydraulic pumps 4 may be provided.

Work Tool 6

The work tool 6 and the control valve 8 are connected by a pair of pipelines 16, 18. In FIG. 1, a single-acting work tool (e.g., a hydraulic hammer) is shown as the work tool 6, and for the single-acting work tool, one of the pair of pipelines 16, 18 (in the illustrated example, the pipeline 16) is used only as the supply pipeline for supplying operating oil to the work tool 6, and the other of the pair of pipelines 16, 18 (in the illustrated example, the pipeline 18) is used only as the discharge pipeline for discharging operating oil from the work tool 6.

The work tool 6 is not limited to the single-acting work tool described above, and may be a double-acting work tool. For the double-acting work tool, the pair of pipelines 16, 18 are used alternatively as supply and discharge pipelines. Here, a grapple for grabbing wood, etc. for example is taken as an example of double-acting work tool.

Although FIG. 1 illustrates a hydraulic motor activating a movable portion of the work tool 6 as the work tool 6, the hydraulic actuator activating the movable portion of the work tool 6 may be a hydraulic cylinder.

Control Valve 8

The control valve 8 according to the illustrated embodiment has a closed position **8*a* that closes an oil path from the hydraulic pump 4 to the work tool 6 and closes an oil path from the work tool 6 to the operating oil tank 12, a first open position 8*b* that communicates the pump pipeline 14 with the pipeline 16 and communicates the pipeline 18 with the first return pipeline 20 (a pipeline that connects the control valve 8 with the operating oil tank 12), and a second open position 8*c* that communicates the pump pipeline 14 with the pipeline 18 and communicates the pipeline 16 with the first return pipeline 20**.

Note that in the case where the single-acting work tool is mounted, any one of the closed position **8*a* and the first and second open positions 8*b* and 8*c* is used, and in the case where the double-acting work tool is mounted, any two of the closed position 8*a* and the first and second open positions 8*b* and 8*c*** are used.

First Check Valve 22, Oil Cooler 24

A first check valve 22 and an oil cooler 24 are disposed in the first return pipeline 20 connecting the control valve 8 to the operating oil tank 12. The first check valve 22 allows flow from the control valve 8 side to the operating oil tank 12 side and prevents flow from the operating oil tank 12 side to the control valve 8 side. The oil cooler 24 is provided on the downstream side (the operating oil tank 12 side) of the first check valve 22.

Second Check Valve 28

The hydraulic circuit 2 is provided with a second return pipeline 26 that branches from the first return pipeline 20 and extends to the operating oil tank 12 without passing through the oil cooler 24. A second check valve 28 is disposed in the second return pipeline 26, and the second check valve 28, similar to the first check valve 22, allows flow from the control valve 8 side to the operating oil tank 12 side and prevents flow from the operating oil tank 12 side to the control valve 8 side.

Solenoid Valve 32

In addition, the hydraulic circuit 2 is provided with a third return pipeline 30 that branches from the pipeline 18 (a pipeline used only as an outlet pipeline when a single-acting work tool is mounted) and extends to the first return pipeline 20. The third return pipeline 30 is connected to the first return pipeline 20 between the first check valve 22 and the oil cooler 24. A solenoid valve 32 is provided in the third return pipeline 30.

In the example shown in FIG. 1, because the work tool 6 is a single-acting work tool, the third return pipeline 30 extends from the pipeline 18 used only as the discharge pipeline, but if the work tool 6 is a double-acting work tool, a fourth return pipeline (not shown) that branches from the pipeline 16 and extends to the first return pipeline 20 may be provided. The fourth return pipeline may be connected to the first return pipeline 20 between the first check valve 22 and the oil cooler 24 in the same manner as the third return pipeline 30, and a solenoid valve may be disposed in the fourth return pipeline.

As shown in FIG. 1, the hydraulic circuit 2 further comprises an operating device 34 that outputs a signal for activating the work tool 6, a controller 36 that open the control valve 8 and the solenoid valve 32 based on the signal output from the operating device 34, and a temperature sensor 38 that detects the temperature of the operating oil.

Operating Device 34

The operating device 34 may have an input device (e.g. a joystick a slide switch) that increases the output strength of the electrical signal as the amount of operation increases. In addition to signals for operating the work tool 6 the operating device 34 may output signals for operating hydraulic actuators other than the work tool 6.

Controller 36

The controller 36 is comprised of a computer having processing and storage devices. As shown in FIG. 1, the controller 36 is electrically connected to the hydraulic pump 4, the control valve 8, the operating device 34, and the temperature sensor 38. Although not shown, the solenoid valve 32 is also electrically connected to the controller 36.

In the controller 36, the capacity of the hydraulic pump 4 is controlled in accordance with the signal output from the operating device 34 and the temperature sensor 38, and the control valve 8 and the solenoid valve 32 are opened.

Temperature Sensor 38

The temperature sensor 38 is attached to the operating oil tank 12, and the temperature of the operating oil detected by the temperature sensor 38 is transmitted to the controller 36.

The hydraulic circuit 2 of the illustrated embodiment includes a first relief pipeline 40 that branches from the pipeline 16 and extends to the operating oil tank 12, a second relief pipeline 42 that branches from the pipeline 18 and extends to the operating oil tank 12, a first relief valve 44 disposed in the first relief pipeline 40, and a second relief valve 46 disposed in the second relief pipeline 42.

Furthermore, the hydraulic circuit 2 has a first replenishment pipeline 48 attached to the first relief pipeline 40, a first replenishment check valve 50 disposed in the first replenishment pipeline 48, a second replenishment pipeline 52 attached to the second relief pipeline 42, and a second replenishment check valve 54 disposed in the second replenishment pipeline 52.

The first replenishment pipeline 48 is connected to the first relief pipeline 40 in a manner that bypasses the first relief valve 44, with the first replenishment check valve 50 and the first relief valve 44 arranged in parallel. The first replenishment check valve 50 allows flow from the operating oil tank 12 side to the pipeline 16 and prevents flow from the pipeline 16 to the operating oil tank 12 side.

The second replenishment pipeline 52 is connected to the second relief pipeline 42 in a manner that bypasses the second relief valve 46 in the same manner as the first replenishment conduit 48, with the second replenishment check valve 54 and the second relief valve 46 arranged in parallel. The second replenishment check valve 54 allows flow from the operating oil tank 12 side to the pipeline 18 and prevents flow from the pipeline 18 to the operating oil tank 12 side.

Then, when negative pressure occurs in the pipelines 16 and 18, the first and second replenishment check valves 50 and 54 are opened, and the operating oil is replenished into the pipelines 16 and 18, thereby preventing the occurrence of cavitation.

Operation of Hydraulic Circuit 2

Next, the operation of the hydraulic circuit 2 as described above will be described.

If the operating device 34 is not operated, no signal is output from the operating device 34 to the controller 36. In this case, no open command is output from the controller 36 to the control valve 8, and the control valve 8 is positioned in the closed position 8*a*. Thus, the discharged oil of the hydraulic pump 4 is supplied to the work tool 6 to run the work tool 6. In addition, the open command is not output from the controller 36 to the solenoid valve 32, and the blocking state of the solenoid valve 32 is maintained.

When the operating device 34 is operated, a signal is output from the operating device 34 to the controller 36. The controller 36 then activates the control valve 8 to open the oil path from the hydraulic pump 4 to the work tool 6.

Figure 2:
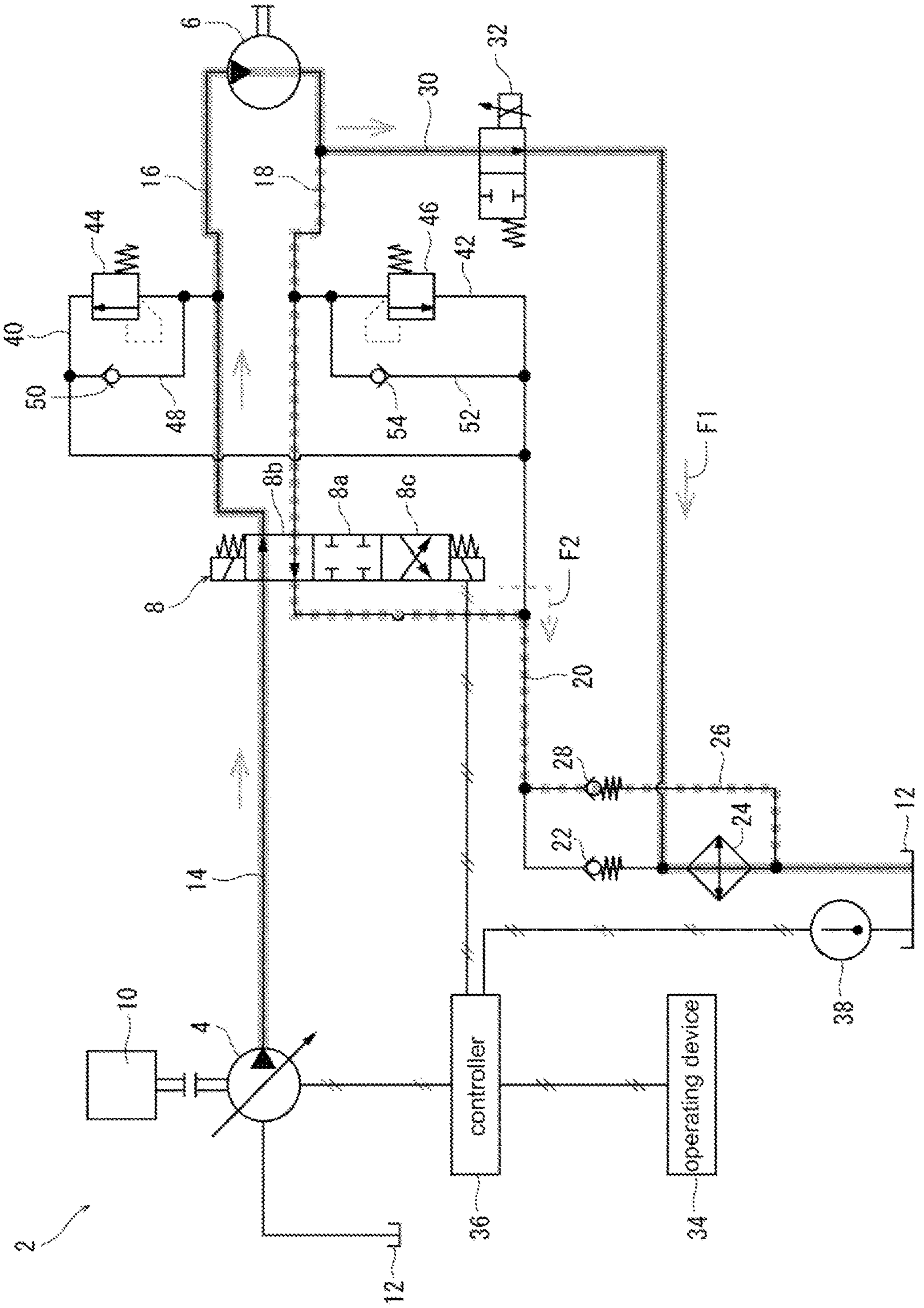
FIG. 2 is a circuit diagram illustrating a flow of the operating oil when the work tool operates.

In the illustrated embodiment, as shown in FIG. 2, the controller 36 positions the control valve 8 in the first open position 8*b*, causing communication between the pump pipeline 14 and the pipeline 16 and between the pipeline 18 and the first return pipeline 20. Thus, the discharged oil of the hydraulic pump 4 is supplied to the work tool 6 to run the work tool 6. At this time, when the temperature of the operating oil detected by the temperature sensor 38 is larger than or equal to a predetermined value, the opening area of the control valve 8 is controlled to be a predetermined area A (see FIG. 3), and the discharge amount of the hydraulic pump 4 is adjusted to the predetermined discharge amount Q (see FIG. 4).

The controller 36 also causes the solenoid valve 32 to be opened when a signal is output to the controller 36 from the operating device 34. The opening area of the solenoid valve 32 at this time is set such that the resistance of the path through the third return pipeline 30 (the path indicated by arrow F1 in FIG. 2) is lower than the resistance of the path through the pipeline 18, the control valve 8, the first return pipeline 20, and the second return pipeline 26 (the path indicated by dashed arrow F2 in FIG. 2).

Accordingly, many of the operating oil discharged from the work tool 6 passes through the third return pipeline 30 (path F1) and is cooled in the oil cooler 24 before returning to the operating oil tank 12, thereby suppressing excessive rise in the temperature of the operating oils.

In addition, when a signal is output to the controller 36 from the operating device 34, the pipeline 18 and the first return pipeline 20 are in communication through the control valve 8, and thus a portion of the operating oil may be returned to the operating oil tank 12 through the path F2.

As described above, when a signal is output from the operating device 34 to the controller 36, the controller 36 opens the control valve 8 and the solenoid valve 32. However, when the temperature of the operating oil is low and the viscosity of the operating oil is high, the pressure on the upstream side of the oil cooler 24 may increase and the oil cooler 24 may be damaged, so that the controller 36 reduces the amount of operating oil passing through the oil cooler 24 (the amount of operating oil passing through the path F1) when the temperature of the operating oil detected by the temperature sensor 38 is less than a predetermined value.

Specifically, the controller 36 makes the opening area of the control valve 8 when the temperature detected by the temperature sensor 38 is less than a predetermined value be larger than the opening area (predetermined area A) of the control valve 8 when the temperature detected by the temperature sensor 38 is larger than or equal to the predetermined value.

As a result, the resistance of the path F2 decreases, and the amount of operating oil passing through the path F2 and returning to the operating oil tank 12 increases, so that the amount of operating oil passing through the oil cooler 24 decreases. Thus, it is possible to suppress an excessive increase in the pressure on the upstream side of the oil cooler 24 and prevent damage to the oil cooler 24.

Figure 3:
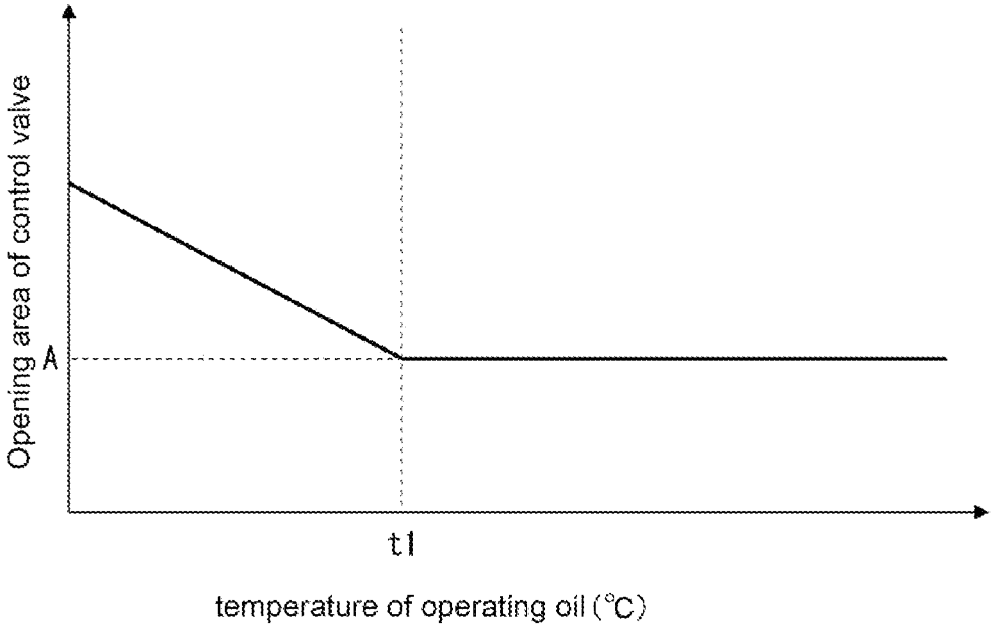
FIG. 3 is a graph showing the relationship between the temperature of the hydraulic oil detected by the temperature sensor and the opening area of the control valve.

As shown in FIG. 3, the controller 36 preferably gradually increases the opening area of the control valve 8 as the temperature of the opening oil detected by the temperature sensor 38 decreases. The lower the temperature of the operating oil and the higher the viscosity of the operating oil, the higher the pressure on the upstream side of the oil cooler 24 is easier to rise, and the opening area of the control valve 8 is gradually increased as the operating oil temperature decreases, thus effectively suppressing the excessive rise of the pressure on the upstream side of the oil cooler 24.

Although the opening control of the control valve 8 has been described as a control to reduce the amount of operating oil passing through the oil cooler 24, the controller 36 may perform controls other than the opening control of the control valve 8. For example the controller 36 may make the discharge amount of the hydraulic pump 4 when the temperature detected by the temperature sensor 38 is less than a predetermined value be less than the discharge amount of the hydraulic pump 4 when the temperature detected by the temperature sensor 38 is greater than or equal to the predetermined value.

As a result, the amount of hydraulic oil in the path F1 passing through the oil cooler 24 is also reduced, thereby suppressing excessive pressure rise on the upstream side of the oil cooler 24 and preventing damage to the oil cooler 24.

Figure 4:
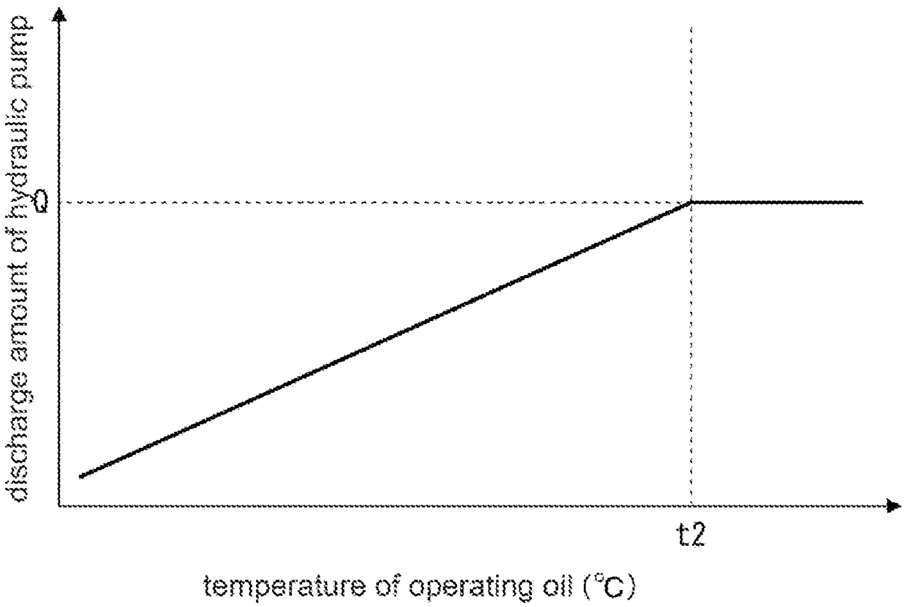
FIG. 4 is a graph showing the relationship between the temperature of the operating oil detected by the temperature sensor and the discharge amount of the hydraulic pump.

Furthermore, as shown in FIG. 4, the controller 36 is preferably gradually reducing the discharge amount of the hydraulic pump 4 as the temperature of the operating oil detected by the temperature sensor 38 decreases. As a result, the lower the temperature of the hydraulic oil and the higher the viscosity of the hydraulic oil, the lower the amount of operating oil in the path F1 passing through the oil cooler 24, so that the excessive pressure increase on the upstream side of the oil cooler 24 can be effectively suppressed.

Such discharge amount control of the hydraulic pump 4 can be executed together with the opening area control of the control valve 8 described above. In addition, a predetermined value t2 (see FIG. 4) of the temperature pertaining to the discharge amount control of the hydraulic pump 4 may be the same as a predetermined value t1 of the temperature pertaining to the opening area control of the control valve 8 (see FIG. 3), and may be at different temperatures (e.g., t2>t1).

As described above, in the hydraulic circuit 2 of the illustrated embodiment, when a signal is output from the operating device 34, the solenoid valve 32 is opened together with the control valve 8, and the operating oil discharged from the work tool 6 returns to the operating oil tank 12 through the solenoid valve 32 and the oil cooler 24, so that the temperature of the operating oil can be suppressed from rising excessively.

In addition, in the hydraulic circuit 2, when the temperature detected by the temperature sensor 38 is less than a predetermined value, the amount of operating oil passing through the oil cooler 24 is reduced, so that the excessive pressure rise on the upstream side of the oil cooler 24 can be suppressed and the damage to the oil cooler 24 can be prevented.

Although the above-described description describes an example in which the opening area of the control valve 8 is controlled to a predetermined area A if the temperature detected by the temperature sensor 38 is larger than or equal to a predetermined value, the opening area of the control valve 8 may fluctuate depending on the amount of operation applied to the operating device 34. Under such conditions, the opening area of the control valve 8 when the temperature of the operating oil is less than a predetermined value is controlled to be larger than the opening area of the control valve 8 when the temperature of the operating oil is larger than or equal to the predetermined value and the operating amount of the operating device 34 is the same.

In the above-described description, an example is described in which the discharge amount of the hydraulic pump 4 is adjusted so that the discharge amount of the hydraulic pump 4 becomes the predetermined discharge amount Q is adjusted if the temperature detected by the temperature sensor 38 is larger than or equal to a predetermined value, regardless of the operating amount of the operating apparatus 34, but the discharge amount of the hydraulic pump 4 may fluctuate depending on the operating amount applied to the operating apparatus 34. In this case, the amount of discharge of the hydraulic pump 4 when the temperature of the operating oil is less than a predetermined value is controlled to be less than the discharge amount of the hydraulic pump 4 in the case where the temperature of the operating oil is equal to or larger than the predetermined value and the operating amount of the operating device 34 is the same.

What is claimed is:

1. A hydraulic circuit of a construction machine, comprising:

a hydraulic pump having variable capacity, a work tool operated by operating oil discharged by the hydraulic pump, a control valve controlling supply of operating oil from the hydraulic pump to the work tool;

a pair of pipelines connecting the control valve and the work tool;

a first return pipeline connecting the control valve and the hydraulic oil tank;

a first check valve disposed in the first return pipeline;

an oil cooler disposed in the first return pipeline on a downstream side of the first check valve;

a second return pipeline that branches from the first return line and extends into the operating oil tank without passing through the oil cooler;

a second check valve disposed in the second return pipeline;

a third return pipeline that branches from one of the pair of pipelines and extends to the first return pipeline between the first check valve and the oil cooler;

a solenoid valve disposed in the third return pipeline;

an operating device to output a signal for operating the work tool, a controller that opens the control valve and the solenoid valve based on a signal output from the operating device; and a temperature sensor electrically connected to the controller to detect a temperature of the operating oil, wherein the controller reduces the amount of operating oil passing through the oil cooler in the case where the temperature detected by the temperature sensor is less than a predetermined value.

2. The hydraulic circuit of a construction machine according to claim 1, wherein the controller makes an opening area of the control valve in the case where the temperature detected by the temperature sensor is less than the predetermined value be larger than the opening area of the control valve in the case where the temperature detected by the temperature sensor is larger than or equal to the predetermined value.

3. The hydraulic circuit of a construction machine according to claim 2, wherein the controller gradually increases the opening area of the control valve as the temperature detected by the temperature sensor decreases.

4. The hydraulic circuit of a construction machine according to claim 1, wherein the controller makes a discharge amount of the hydraulic pump in the case where the temperature detected by the temperature sensor is less than the predetermined value be less than the discharge amount of the hydraulic pump in the case where the temperature detected by the temperature sensor is larger than or equal to the predetermined value.

5. The hydraulic circuit of a construction machine according to claim 4, wherein the controller gradually reduces the discharge amount of the hydraulic pump as the temperature detected by the temperature sensor decreases.

* * * * *